July 13, 1937.  A. J. McMASTER  2,087,039
COUNTING SYSTEM
Filed Aug. 20, 1932  2 Sheets-Sheet 1

Inventor
Archie J. McMaster
By Mueller & McLaughlin
Attys

July 13, 1937.    A. J. McMASTER    2,087,039
COUNTING SYSTEM
Filed Aug. 20, 1932    2 Sheets-Sheet 2

Inventor:
Archie J. McMaster
By Mueller & McLaughlin
attys

Patented July 13, 1937

2,087,039

UNITED STATES PATENT OFFICE 2,087,039

COUNTING SYSTEM

Archie J. McMaster, Highland Park, Ill., assignor to G-M Laboratories, Inc., Chicago, Ill., a corporation of Illinois Application August 20, 1932, Serial No. 629,722

2 Claims. (Cl. 235—92)

My invention relates generally to counting systems and more particularly to production counting systems for controlling subordinate machine operations.

In the process of filling packages or containers from conveyors or other automatically operated machines of various kinds, it is often desirable to count the product as it is delivered to the package. It is further desirable to count out the product into packages or lots containing a predetermined number of articles.

Various devices, including light sensitive cell systems, have been employed for this purpose, but such prior devices have been seriously limited in their speed and accuracy of count, in their promptness of response in actuating subordinately controlled equipment, and in the type of articles that could be handled.

In electric counting systems employing light sensitive cells difficulties more or less peculiar to this type of systems are encountered. This is especially so in a system used with a photoelectric cell wherein a long lead extends from the cell to the control grid of an amplifier, as, for example, when the cell and amplifier are separately housed and located at a considerable distance from each other, which is usually necessary.

It is accordingly an object of my present invention to provide an improved means for accurately counting the number of objects passing a given point in rapid succession.

A further object is to provide means for accurately recording the count of such objects.

A further object is to provide in a counting device means for automatically grouping the counted articles into lots of any selected predetermined numbers of articles.

Another object is the provision of improved photoelectric means for actuating a counting device or similar apparatus.

A still further object is to provide an improved method of shielding grid connections in electronic amplifiers employed in counting systems.

Other objects and advantages will appear as the description proceeds.

Figure 1:
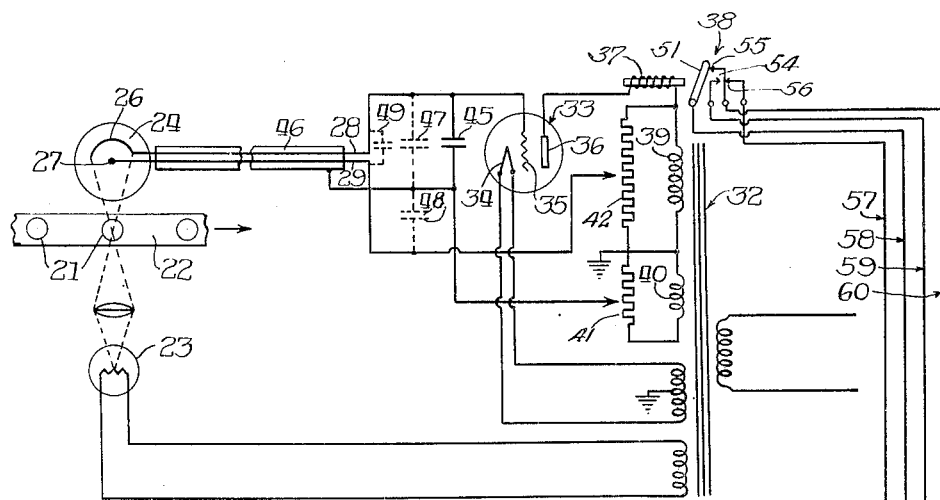
Figure 1:
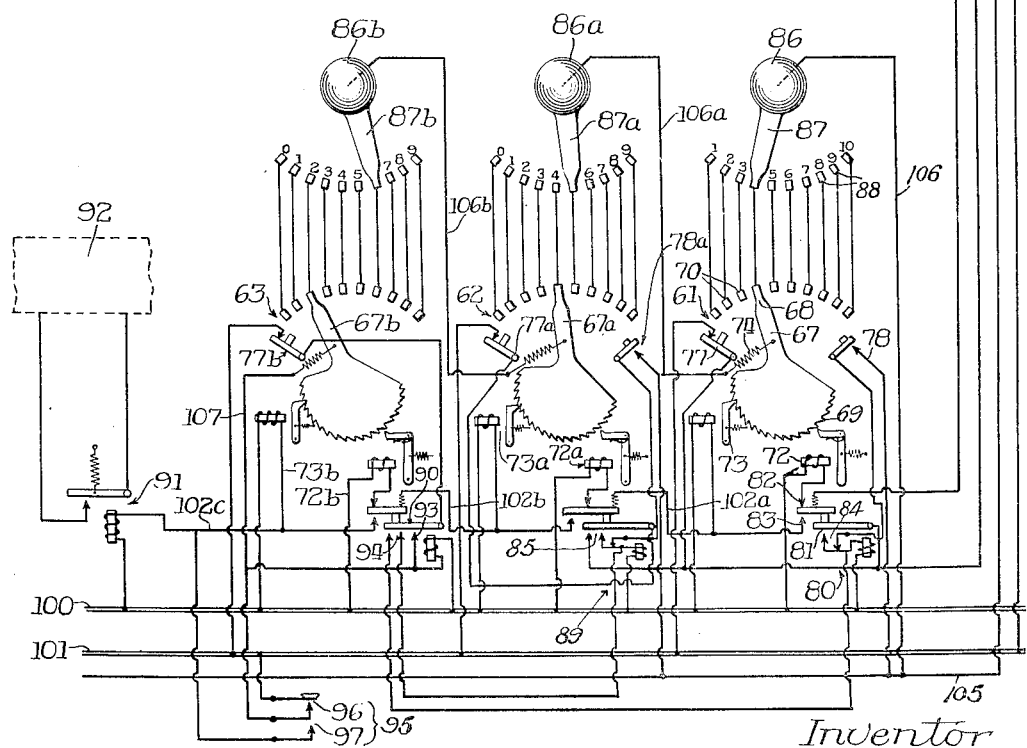
Figure 2:
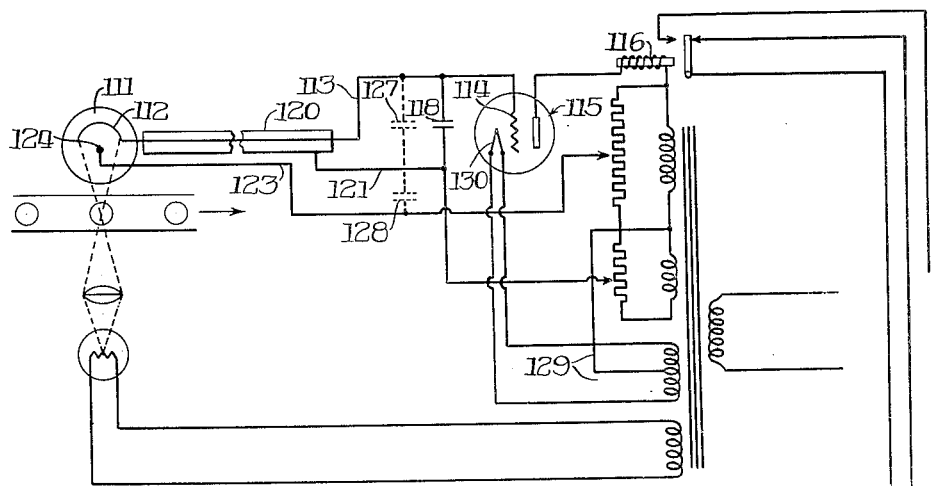
Figure 2:
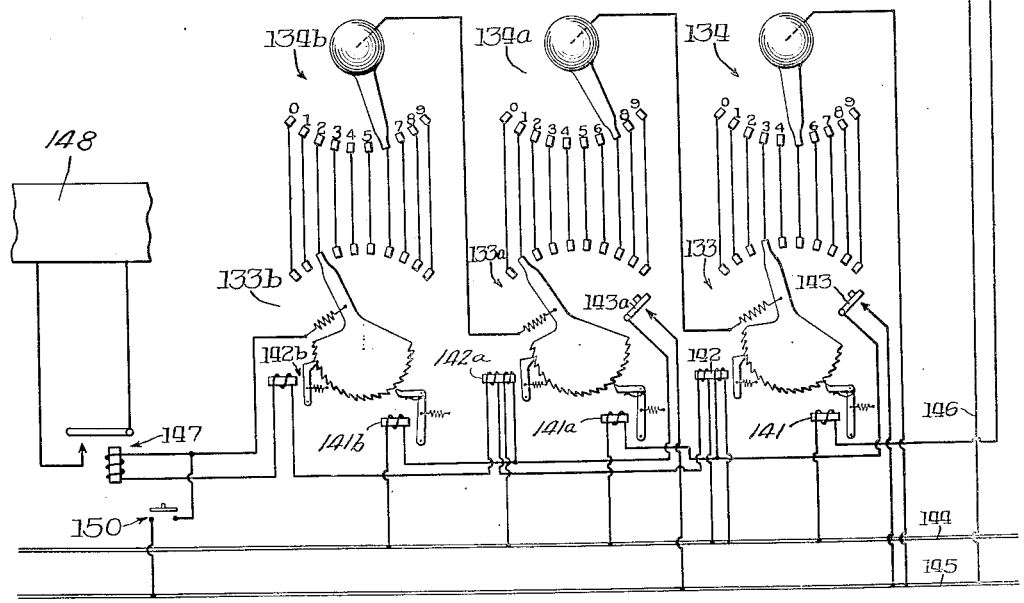

In order to acquaint those skilled in the art with the teachings and practice of my present invention, I shall now describe some specific embodiments thereof, reference being had to the accompanying drawings forming a part of this specification, and in which:

Figure 1 illustrates, partly in diagram, one form of the preferred embodiment of my invention; and Figure 2 illustrates similarly another embodiment of the principles of my present invention.

In general the counting system shown and described herein employs a photoelectric cell, normally illuminated by a beam of light which is arranged to be interrupted so as to darken the cell by each of the objects to be counted as they pass along a conveyor or the like. The photoelectric cell in being thus alternately darkened and illuminated exhibits an impulse-like response which is suitably amplified and caused to actuate a group of indexing counting switches. The counting switches are arranged in successive stages to count the impulses in units, tens and hundreds, and are each provided with indexing or counting contacts which assume a different contact combination for each number within the capacity of the system. A number of selector switches are associated with the indexing contact combination for completing a circuit, so that the switches as they count the passage of the objects thru the light beam assume the several contact combinations in turn until reaching the selected combination whereupon the switches reset to zero to repeat the count. In resetting they effect the actuation of a subordinate apparatus which preferably consists of an automatic device for physically separating the counted objects into groups, as, for example, by controlling the operation of the conveyor carrying them or by directing them into an empty container. On the other hand, the subordinate apparatus may merely actuate a signal for directing a manual sorting of the objects into groups.

Thus, for example, if it were desired to pack the counted articles into packages of one gross each, the selector switches would be set for the number 144. The counting switches would then count to 144 and repeat and control the packaging equipment accordingly. Should it then be desired to place a different number of articles in each package it is merely necessary to readjust the selector switches to the new number.

In Figure 1, I have illustrated a number of articles or objects 21, which are to be counted as they pass along on a conveyor 22. A suitable light source 23, including a lens system when necessary, directs a beam of light across the path of the objects 21 to a photoelectric cell or light sensitive device 24, the beam of light being so directed that it is substantially interrupted upon the passage through it of each of the objects 21. The photoelectric cell comprises a cathode 26 and an anode 27 which are connected by means of relatively long leads or conductors 28 and 29, respectively, into the circuit of an associated amplifier, the amplifier being located at a considerable distance from the photo-cell 24.

The amplifier is powered by a suitable transformer 32, including a primary winding connected to an alternating current supply. The amplifier further includes an electron valve 33, having a cathode 34, a control grid 35, and a plate 36. A secondary winding 39 of the transformer 32 imposes an alternating voltage between the cathode 34 and the plate 36, an electromagnet winding 37 of a relay 38 being connected in series therewith. Another secondary transformer winding 40, together with a potentiometer 41 connected across its terminals, provides an adjustable alternating voltage for biasing the grid 35 relative to the cathode 34. A second potentiometer 42 is connected across the transformer winding 39 to provide an adjustable control voltage, which is applied to the anode 27 of the photoelectric cell 24.

The bias voltage is applied to the grid 35 through a capacity coupling comprising a condenser 45. The bias potential is also applied to a shield 46 surrounding the conductors 28 and 29. The shield 46 and the conductors 28 and 29 exhibit certain mutual capacities which are represented by capacities 47, 48, and 49 indicated in dotted lines, the capacity 47 between the sheath 46 and the grid connection 28 shunting the condenser 45. It will usually be found that there is a certain optimum capacity for the coupling of the grid to its bias voltage, and it will, therefore, be desirable to select the condenser 45 so that the sum of the capacities 45 and 47 equal that optimum value. Accordingly, the condenser 45 may under certain conditions be eliminated entirely.

The relay 38 is provided with an armature 51 which is arranged to operate normally open contacts 54 and normally closed contacts 55 and 56. These contacts are connected by means of conductors 57, 58, 59 and 60 with a counting device to actuate the same.

The counting device comprises a series of stepping switches or indexing means 61, 62 and 63 and certain other apparatus associated therewith. The switch 61 comprises a rotatable armature or movable member 67 which carries a contact finger 68 and a ratchet 69. The armature is movable through a predetermined arc or path of motion to bring the contact finger 68 into successive engagement with a plurality of contacts 70. A magnetically operable pawl 72 is engageable with the ratchet 69 to step the finger 68 from one contact 70 to the next from left to right, while a magnetically releasable detent 73 engages the ratchet 69 to hold it against the force of a spring 74 in any stepped position which it may occupy. The pawl is held normally clear of the ratchet 69 by means of a spring so as to avoid interfering with the return of the ratchet to its initial position upon its release by the detent 73.

The indexing switch 61 is also provided with a pair of interlocking switches 77 and 78. The switch 77 is spring closed and engageable by the armature 67 to be opened thereby when the latter moves to its extreme left position, while the switch 78 is normally open and is arranged to be closed by the armature 67 when the latter moves to its extreme right position.

These switches 77 and 78 are arranged to control the operation of an auxiliary relay 80, which in turn has contacts 81, 82, 83 and 84 for controlling the pawl 72 and the detent 73 and also the indexing switches 62 and 63 in response to the operation of the switch 61.

Associated with the contacts 70 is a selector switch 86, having a movable contact arm 87 adapted to engage singly each of a series of contacts 88, one of which is connected to each of the contacts 70.

The indexing switches 62 and 63 together with certain of their auxiliary apparatus are similar to the switch 61 and its apparatus. I have accordingly indicated corresponding parts of the indexing switches etc. by similar reference characters, a suffix (a) being added to the characters applied to switch 62, and a suffix (b) to those applied to the switch 63, thus 70a etc. The indexing switch 63 differs from switches 61 and 62 in that it has no interlock switch corresponding to the switches 78 and 78a. Associated with the switches 62 and 63 are auxiliary relays 89 and 90, respectively corresponding to the relay 80. The relay 89 is provided with contacts corresponding to those of the relay 80 and also with a contact 85 for connecting the interlock switch 77a in shunt with the switch 77. The relay 90 is provided with a greater number of contacts than the relay 80 so as to adapt it under certain conditions to control the operation of relays 80 and 89. These contacts are indicated by the reference numeral 94.

The relay 90 is also arranged to actuate a pilot relay 91 in response to the operation of the indexing switches 61, 62 and 63 to effect a control of a connected apparatus 92, which may be arranged to perform any desired operation such as controlling the conveyor 22, suitable packaging equipment or the like. A manual reset switch 95, having sequence operated contacts 96 and 97 is also provided.

Power is supplied to the various circuits of the counter from a pair of power buses 100 and 101. The actuating circuit for the indexing switches 61, 62 and 63 may be traced from the bus 101 through the conductor 60, contact 56 of relay 38, conductor 57 to the contacts 82 and 83 of relay 80. Under certain conditions, the circuit will pass thence along a conductor 102a to the contacts of the relay 89, thence to the contacts of relay 90 and to the coil of relay 91 from which the circuit returns to the opposite power bus 100. These several relays 80, 89 and 90 control the continuity of various parts of this circuit and operate at certain times to extend the same to the various pawl and detent magnets 72, 73, etc.

An interlocking bus 105 is connected to the power bus 101 through the normally open contact 54 of the relay 38. A counting control, or selector circuit extends from this interlocking bus along a conductor 106 to the selector switch 86, thence through the indexing contacts 70 and the contactor 67 of the switch 61 to a conductor 106a and similarly through the other selector and indexing switches to the contactor arm 67b of the indexing switch 63 thence along a conductor 107 through the coil of the relay 90 to the power bus 100.

In operation the photoelectric cell 24 is normally illuminated by the beam from the light 23 and is at least partially darkened upon each passage of one of the objects 21 before it. The cell responds to this decrease of illumination by exhibiting a corresponding decrease in its conductivity, which decrease in conductivity acts to control the operation of the amplifier. In the amplifier, under any particular set of conditions, certain currents will flow in the grid and plate circuits of the tube 33, the magnitude of which currents will depend in part upon the amount of light entering the photoelectric cell 24, and the settings of the potentiometers 41 and 42.

The valve 33 and the cell 24 exhibit a rectifying action when operated on alternating current and consequently, current flows in the plate circuit of the valve 33 during only one half of each voltage cycle, that half cycle being the one which imposes a positive potential on the plate 36 relative to the cathode 34. When the plate 36 is positive, the grid bias potential is negative relative to the cathode.

It will be noted that the grid 35 of the valve 33 is in effect positioned in a series circuit extending between the variable voltage taps of the two potentiometers 41 and 42, being connected through the photoelectric cell 24 to the potentiometer 42 and through the condenser 45 and the capacity 47 to the potentiometer 41. Consequently, the grid potential is determined essentially by the relative impedances of the cell 24 and the combination of the condenser 45 and the capacity 47. When the conductivity of the cell 24 decreases, due to its being darkened by one of the objects 21, that is when its impedance increases, the relation of its impedance to that of the condenser 45 taken together with the capacity 47 is so altered as to impose a greater bias voltage on the grid. In other words, assuming the bias voltage to be negative, the grid potential is lowered by the darkening of the cell 24.

It will also be noted that the circuit controlling the grid potential is one of very high impedance, the cell 24 having an impedance of the order of several megohms. Because of this, the grid potential is susceptible under certain conditions to being controlled by external influences in a degree comparable to the control exercised by the operation of the cell 24 itself. However, the shield 46 which encloses the grid connection 28, since it is connected to the potentiometer 41, is maintained at a predetermined voltage so as to effectively prevent such external influences from affecting the grid of the amplifier.

I have found that a circuit such as I have herein described is substantially unaffected by external disturbances and provides a more sensitive response to the operation of the photocell than do any circuits heretofore employed to meet similar conditions.

The objects 21 in interrupting the light beam, therefore, lower the potential of the grid 35 (assuming the plate potential to be positive) to cause a decrease in the current flowing in the plate circuit, and in emerging from the beam permit the plate current to again increase to its full value. This pulsing plate current traverses the winding 37 of the relay 38 and if the current is of the proper value and the variation sufficient, it will cause the relay first to drop and then pick up its armature 51 as an object passes through the light beam. The plate current may be adjusted so as to produce this operation of the relay by increasing the control voltage by means of the potentiometer 42 until the armature picks up with the photoelectric cell 24 illuminated, and by increasing the grid bias voltage, that is, lowering the bias potential when the plate is positive, by means of the potentiometer 41 until the relay 38 drops its armature with the cell 24 darkened due to the passage of one of the objects 21 through the light beam.

Since these two adjustments are inter-dependent, it may be necessary after adjusting the bias voltage to further increase the photo-cell control voltage. In such case the adjustment of the potentiometer 42 should be carried somewhat beyond the point at which the armature of relay 38 picks up when the cell 24 is illuminated. The grid bias voltage should then be re-adjusted to cause the relay 38 to drop out when the cell is darkened by one of the objects 21.

When the relay 38 releases its armature as a result of an object 21 interrupting the light beam, it operates its three contacts in the following sequence: It first closes contact 55; it then opens contact 54 to isolate the interlocking bus 105; and it finally closes its contact 56 to transmit an electric impulse to the indexing or counting switches. When the armature picks up the operation it is in the reverse order, namely: contact 56 opens, contact 54 closes and contact 55 opens.

Assuming that the relay 80 is de-energized, its normally closed contact 82 will transmit the impulses to the magnet operating the pawl 72 to index the contactor arm 67 toward the right so that it steps from one contact to the next each time an object 21 enters the light beam. If the contactor 67 starts from its extreme left position in engagement with the first contact, it will, after eight impulses, be in engagement with the ninth contact. Upon being indexed by the ninth impulse into the extreme right position, (where it engages the tenth one of contacts 70) it engages the switch 78 by means of an insulating bumper to close the same. The switch 78 thereupon establishes a circuit from the interlocking bus 105, through the contact 84 to the coil of the relay 80. During the interval following the ninth impulse, that is after the ninth object leaves the light beam, the interlocking bus 105 becomes energized through contact 54 of relay 38 and causes the relay 80 to operate, closing the contact 81 and thereafter opening the contact 84. This leaves the coil of relay 80 energized from power bus 101 through the interlock switch 77 and the relay contact 81, which constitute a holding circuit. The relay 80 will now maintain itself until the switch 77 is opened. The contact 84, in opening, has disconnected the coil of relay 80 from the interlocking bus 105 so as to avoid energizing the same through the relay's holding circuit. The relay 80 in operating has also opened the contact 82 and closed the contact 83 so as to condition the circuit to transmit the next impulse to the magnet of the detent 73 and to the contacts of relay 89, which if we assume that the relay 89 is deenergized, will direct the impulse to the magnet of the pawl 72a. Assuming then that the contactor arm 67a of relay 62 is lying in its extreme left position, that is in engagement with its first contact, the next or tenth impulse, which occurs as the tenth object enters the light beam, will operate the pawl 72a to index the arm 67a to its second position and will at the same time operate the detent 73 to permit the arm 67 to return under the action of the spring 74 to its extreme left or original position, where it engages the switch 77 to open the same. It should be noted that as long as the armature of relay 38 is released due to the object remaining in the light beam, the contact 55 shunts the interlock switch 77 to maintain the holding circuit of the relay 80. This positively prevents the relay 80 from re-closing the circuit to the magnet of the pawl 72 until after the tenth impulse.

That is, it prevents the relay 80 from operating to energize first the detent 73 and then the pawl 72 in response to one and the same impulse. Therefore, after the tenth impulse, that is after the tenth object leaves the light beam, the contact 55 opens so that the relay 80 returns to its normal position with its contacts 81 and 83 open and its contacts 82 and 84 closed, so as to condition the circuit to transmit the subsequent impulses to the magnet of the pawl 72 to again step the arm 67 through its path of travel. It is thus seen that the arm 67 is repeatedly indexed toward the right by nine impulses and then returned to its starting position by the tenth, each tenth impulse being also transmitted to pawl 72a to operate indexing switch 62. The indexing switch 62 operates in the same manner as does the switch 61, being indexed toward the right by nine impulses and returned to its starting position by the tenth, each tenth impulse received by the switch 62 being also transmitted to switch 63. The tenth impulse received by the switch 62 will of course be the hundredth impulse and the tenth received by the switch 63, the thousandth.

When the relay 89 is energized in response to the indexing arm 67a reaching its extreme right position, it closes a holding circuit through its contacts 85 to the contacts 55 of the relay 38. The purpose of the holding circuit is to prevent the relay 89 from releasing before the end of the impulse which operates the detent 73a in the same manner as described in connection with the relay 80.

It will be noted that the ten selector contacts 88 of switch 86 which are connected to indexing contacts 70 of indexing switch 61 are numbered 1 to 10 inclusive and that the selector contacts of each of the other switches are numbered from 0 to 9 inclusive. Thus, the indexing switch 61 is always connected to a selector contact corresponding to a number one unit greater than the number of impulses that it has received. This means that the first impulse steps the arm 67 into engagement with the second indexing contact which is connected to selector contact number 2, the second impulse completes the circuit to contact number 3, etc. On the other hand, the arm of each of the indexing switches 62 and 63 always makes a circuit to a selector contact corresponding to the number of impulses which it has received. For example, as shown in the drawings, the indexing switch 63 indicates the number 2, switch 62 the number 4 and switch 61 the number 4; that is, the three indexing switches indicate the number 244 which is the condition obtaining after receiving 243 impulses.

The selector switches 86, 86a and 86b are set for the number 654. After 653 impulses each indexing arm will be connected through the indexing and selector contacts to the arm of its corresponding selector switch. A circuit will accordingly be completed from the interlocking bus 105 along conductor 106 through all the selector and indexing switches, along the conductor 107 to the coil of relay 90 and thence to the power bus 100. During the interval between the 653rd and 654th impulses, the normally open contact 54 of the relay 38 (when the relay 38 picks up) will connect the interlocking bus 105 to the power bus 101 so as to energize the relay 90, causing it to close its contact 93 to establish a holding circuit direct from the bus 101 through the interlocking switch 77b. It will also close the contacts 94, one of which is connected to each of the relays 80 and 89 to energize the same which also establish holding circuits through the switches 77 and 77a and the contact 55 of the relay 38. The holding circuits will be then all connected in parallel so that all must open before any of the relays 80, 89 or 90 will release. The impulse circuit will, at the same time, be connected to the magnets of all the detents 73, 73a and 73b and to the coil of pilot relay 91.

Therefore, upon the occurrence of the 654th impulse, that is when the 654th object enters the light beam, the relay 91 operates to actuate the subordinate apparatus 92, and the several indexing arms return to their starting positions, thereby opening the switches 77, 77a and 77b to release the relays 80, 89 and 90. The apparatus is then ready to begin counting out another group of 654.

It thus will be seen that the indexing switches 61, 62 and 63 each function as a counting device or counting means. The indexing switch 62 serves to repeatedly count out groups of 10 of the impulses transmitted by the operation of relay 38. The indexing switch 62 serves to count the number of impulses which are transmitted to it through the contact 83 of the relay 80. In so doing it counts the number of times that the contactor 67 of the indexing switch 61 is reset to its starting position; that is, it counts the cycles of operation of the indexing switch 61. Similarly, the indexing switch 63 serves to count the number of cycles of operation of the indexing switch 62.

It also will be seen that the relays 80, 89 and 90 function to control the reset operations of the indexing switches 61, 62 and 63 respectively. Therefore these relays constitute reset control means. The actual resetting of the contactors of the indexing switches is accomplished by the magnets of the detents 73, 73a and 73b together with the springs, such as the spring 74, which serve to bias the contactors 67, 67a and 67b to their starting positions. Thus the magnet associated with the detents 73 of the indexing switch 61, together with the return spring 74 constitute means for resetting or returning the contactor 67 to its extreme left or starting position.

In the operation of any counting system it obviously is important that no counts be recorded due to extraneous influences. When operated continuously my improved counting system will make an accurate count and will properly control a grouping or packaging device in accordance with any number that may be selected.

When first putting the device into operation it will usually be necessary to experiment somewhat by passing several objects through the light beam in order to adjust the potentiometers 41 and 42 in the manner already described to obtain a proper operation of the relay 38. It will be apparent that the specific adjustment required of the potentiometers 41 and 42 will depend upon the size and opacity of the objects to be counted. When this adjustment has been made the light beam should be left unobstructed so that the relay 38 draws up its armature. The manual reset switch 95 should then be operated to set the indexing or counting switches to their zero positions. The switch 90 first closes its contact 96 to energize the relay 90 which when it operates, energizes the relays 80 and 89 through its contacts 94 so that the magnets of the several detents 73, 73a and 73b and the coil of relay 91 are connected together. The switch 95 then closes its contact 97 to energize the detents 73, 73a and 73b and the relay 91, thereby bringing all the indexing arms 67, 67a and 67b to their starting positions and actuating the subordinate apparatus 92 for separating the few articles used in the preliminary test from those to be subsequently counted. The selector switches may be set according to the numbers appearing on the selector contacts for any quantity from one to a thousand inclusive.

Should it be desirable to discontinue operation, as, for example, when shutting down over night, or the like, the conveyor 22 should be stopped in such position that the objects 21 do not interrupt the light beam, power should then be removed from the buses 100 and 101 of the indexing switches and then the transformer 32 may be de-energized. To restart the transformer should be reconnected to its power supply, and then after waiting for the light source 23 and the cathode 34 of the valve 33 to come up to proper temperature so that the relay 38 draws up its armature, power may be applied to the buses 100 and 101 and the operation of the conveyor resumed.

In Figure 2, I have illustrated a slightly modified system for carrying out my present invention. It includes a photoelectric cell and amplifier circuit which differs from that shown in Figure 1, in the manner of shielding the leads which extend between the cell and its amplifier.

A photoelectric cell or light responsive means 111 has its cathode 112 connected by means of a conductor 113 to the grid 114 of an electron valve 115. A bias voltage is applied to the grid 114 through a condenser 118 and to a sheath 120 surrounding the conductor 113 by means of a connection 121. A lead 123 from the anode 124 of the cell 111 lies outside the shield 120, though in practice it may be in close proximity thereto, being assembled into the same cable therewith. The shield 120 exhibits a certain capacity with respect to each of the conductors 113 and 123. These are indicated as capacities 127 and 128 shown in dotted lines. A ground connection may be applied to the circuit at any suitable point, as, for example, at connection 129 so as to apply ground potential to the cathode 130 of the electron valve, or at connection 121 so as to ground the shield 120.

The device of Figure 2 also includes a counting means comprising a bank of indexing switches 133, 133a and 133b, having selector switches 134, 134a and 134b associated therewith. The indexing switches are provided with magnetically operated detents 142, 142a and 142b, of which detents 142 and 142a have each two coils, and with interlock switches 143 and 143a. Power for operating the counter is supplied from a pair of buses 144 and 145. The magnet of the pawl 141 is arranged to be energized through an actuating circuit 146 by the contacts of relay 116 so as to index the switch 133 in response to the passage of objects through the light beam. The detent 142 of indexing switch 133 and the pawl 141a of switch 133a are under control of the interlocking switch 143 which is operable by the indexing switch 133 when indexed into its tenth or extreme right position. Similarly, the detent 142a and the pawl 141b are under the control of the interlocking switch 143a.

A pilot relay 147 for controlling a subordinate apparatus 148, together with the magnetic detents 142, 142a and 142b are arranged to be actuated in response to either the operation of the indexing or counting switches in accordance with the setting of the selector switches, or the operation of a normally open manual reset switch 150.

In operation, the device of Figure 2 counts objects passing before the photoelectric cell in much the same manner as does the device of Figure 1.

However, under certain conditions the photocell and amplifier of Figure 2 is more sensitive in its response than is that of Figure 1, because of the relations existing between the mutual capacities of the cell leads 113 and 123 and the shield 120 in view of the optimum capacity for the coupling between the grid and the source of its bias voltage. It is desirable to keep the capacity between the leads 113 and 123 low in comparison to the sum of the coupling capacities 118 and 127 in order to avoid having an excessive capacity shunt across the terminals of the photoelectric cell. In the circuit of Figure 2, this shunt capacity is minimized by carrying the conductor 123 outside of the shield 120. The arrangement of Figure 2, therefore, provides a greater inherent sensitivity in the photoelectric cell and its amplifier so as to permit the use, under certain conditions, of much longer leads.

As in the device of Figure 1, impulses are transmitted to the counter in response to the passing of objects before the photoelectric cell. The impulses actuate the pawl 141 to index the arm of the relay 133, which steps up one position in response to each impulse. The tenth impulse moves the arm of the relay into its extreme right or tenth position to actuate the interlock switch 143. Upon closing, the switch 143 energizes one winding of the magnet of the detent 142 and also the magnet of the pawl 141a so as to simultaneously index the relay 133a from its first or rest position into engagement with its second indexing contact, and release the arm of the relay 133 to permit its return to its rest position. It will be noted that the switch 143 maintains the coils of the pawl 141a and the detent 142 energized only so long as the arm of relay 133 occupies its extreme right position. For this reason, it is desirable that the pawl be comparatively quick acting while the detent should be slower than either the pawl or the relay arm. The detent thereby holds the switch 143 closed until the pawl has time to operate, and then when it releases the relay to cause its own de-energization maintains disengagement long enough to permit the relay to return to its rest position.

Thus, after ten impulses the relay 133 occupies its rest position so as to provide a connection to the selector contact marked "0" while the relay 133a occupies its second position so as to engage the indexing contact marked "1". In a like manner, relay 133b is indexed one step at each hundredth impulse.

When the indexing relays have received the number of impulses indicated by the setting of their selector switches, they operate to return themselves to their "zero" or starting positions at the extreme left of their respective arcs of travel, and at the same time actuate the pilot relay 147 to control the associated apparatus 148. As shown in the drawings the selectors are set at the number 675 and accordingly upon the occurrence of the 675th impulse, the circuit is closed through the several indexing arms and the selector switches, to the relay 147 and to one of the coils on the magnet of each of the detents 142, 142a and 142b. The relay 147 thereupon draws up its armature to close a circuit to the device 148 and the several detents release the indexing arms to permit their return under the action of their springs to their extreme left positions. The device is then ready to repeat the count. Whenever it may be desired to manually reset the counting switches to zero, the push button switch 150 may be depressed to energize the coil of relay 147 and also the magnets of the detents 142, 142a and 142b so that the indexing arms return to their zero or extreme left positions. As in the case of the device of Figure 1, the subordinate apparatus 148 is also actuated when the counting switches are reset manually.

While I have shown and described certain specific embodiments of my invention, it will be apparent to those skilled in the art that such embodiments are shown merely by way of example and that the principles thereof are capable of a much broader application. I, therefore, do not wish to be limited except by the scope of the appended claims.

I claim:—

1. In a system of the class described, means for producing electric impulses, an indexing switch having a reciprocable contactor biased to starting position and operable through steps, a first electromagnet for operating said contactor through said steps, one step at a time for each impulse, retaining means for retaining said contactor in advanced position, a second electromagnet for releasing said retaining means to permit said contactor to return to starting position in response to a single impulse, a relay adapted to direct impulses to either of said electromagnets and adapted further to operate when said contactor reaches a predetermined stepped position so as to direct an impulse to said second electromagnet and operable further when said contactor has returned to its starting position to direct impulses to said first electromagnet.

2. In a system of the class described, means for producing electric impulses, an indexing switch having a reciprocable contactor biased to starting position and operable through steps, a first electromagnet for operating said contactor through said steps, one step at a time for each impulse, retaining means for retaining said contactor in advanced position, a second electromagnet for releasing said retaining means to permit said contactor to return to starting position in response to a single impulse, a relay adapted to direct impulses to either of said electromagnets and adapted further to operate when said contactor reaches a predetermined stepped position so as to direct an impulse to said second electromagnet and operable further when said contactor has returned to its starting position to direct impulses to said first electromagnet, counting means for counting impulses directed to said second electromagnet, reset means for said counting means and second relay means operable when a predetermined number of impulses to said second electromagnet have been counted and said contactor reaches another predetermined stepped position for causing an impulse to be directed to said second electromagnet and for causing the operation of said reset means.

ARCHIE J. McMASTER.